US011459931B2

(12) United States Patent
Reissig et al.

(10) Patent No.: US 11,459,931 B2
(45) Date of Patent: Oct. 4, 2022

(54) ASSEMBLY AND METHOD FOR BRAKING THE DISPLACEMENT OF A TAILPIPE COVER

(71) Applicant: Cisma Solutions ApS, Silkeborg (DK)

(72) Inventors: Sebastian Reissig, Striegistal (DE); Raul Jurj, Stuttgart (DE); Sebastian Radtke, Leinfelden-Echterdingen (DE)

(73) Assignee: Cisma Solutions ApS, Silkeborg (DK)

( * ) Notice: Subject to any disclaimer, the term of this patent is extended or adjusted under 35 U.S.C. 154(b) by 443 days.

(21) Appl. No.: 16/789,068

(22) Filed: Feb. 12, 2020

(65) Prior Publication Data

US 2020/0248610 A1 Aug. 6, 2020

Related U.S. Application Data

(63) Continuation of application No. PCT/EP2018/070815, filed on Aug. 1, 2018.

(51) Int. Cl.
*F01N 13/08* (2010.01)
*F01N 13/18* (2010.01)
(Continued)

(52) U.S. Cl.
CPC ....... *F01N 13/082* (2013.01); *F01N 13/1816* (2013.01); *B60K 13/04* (2013.01);
(Continued)

(58) Field of Classification Search
CPC .......... F01N 13/08; F01N 13/14; F01N 13/18; F01N 13/20; F01N 13/082;
(Continued)

(56) References Cited

U.S. PATENT DOCUMENTS

| 4,936,412 A | * | 6/1990 | Sala | ...................... B60K 13/04 |
| | | | | 181/269 |
| 6,109,661 A | * | 8/2000 | Cwik | ................. F16L 27/1004 |
| | | | | 285/299 |

(Continued)

FOREIGN PATENT DOCUMENTS

| DE | 195 17 462 A1 | 11/1995 |
| DE | 102 33 498 A1 | 1/2004 |

(Continued)

*Primary Examiner* — Edgardo San Martin
(74) *Attorney, Agent, or Firm* — Hackler Daghighian Martino & Novak

(57) ABSTRACT

An assembly for braking the displacement of a tailpipe cover is disclosed. The assembly has a clamping element with an elastic material, a tailpipe, and a tailpipe cover. The clamping element is arranged at least indirectly on the tailpipe and on the tailpipe cover. A section of the clamping element extends over the tailpipe in the axial direction parallel to the longitudinal axis of the tailpipe cover. The distance between the longitudinal axis and the clamping element is designed to be at least partly shorter than the distance between the longitudinal axis and the tailpipe in said clamping element section. Alternatively or in addition thereto, at least one section of the clamping element is arranged at least indirectly against the tailpipe in an immovable manner in the direction of the longitudinal axis.

8 Claims, 5 Drawing Sheets

(51) Int. Cl.
*B60K 13/04* (2006.01)
*F01N 13/20* (2010.01)

(52) U.S. Cl.
CPC .......... *F01N 13/1844* (2013.01); *F01N 13/20* (2013.01); *F01N 2270/08* (2013.01); *F01N 2450/18* (2013.01)

(58) Field of Classification Search
CPC ............. F01N 13/1816; F01N 13/1844; F01N 13/1838; F01N 2470/24; F01N 2270/08; F01N 2450/18; B60K 13/00; B60K 13/04
See application file for complete search history.

(56) References Cited

U.S. PATENT DOCUMENTS

| | | | | |
|---|---|---|---|---|
| 6,595,318 | B2 * | 7/2003 | Ebinger | F01N 13/20 181/227 |
| 7,007,720 | B1 * | 3/2006 | Chase | F16L 59/12 181/227 |
| 9,926,828 | B2 * | 3/2018 | Schwarz | F01N 13/1805 |
| 10,161,288 | B2 * | 12/2018 | Laursen | F01N 13/1855 |
| 10,344,658 | B2 * | 7/2019 | Minowa | F01N 13/082 |
| 2019/0316511 | A1 * | 10/2019 | Orille | F01N 13/1838 |
| 2020/0182122 | A1 * | 6/2020 | Reissig | F01N 13/141 |

FOREIGN PATENT DOCUMENTS

| | | | | |
|---|---|---|---|---|
| DE | 102012008243 A1 * | 10/2013 | | F01N 13/08 |
| DE | 102013017947 A1 * | 5/2015 | | F01N 13/082 |
| DE | 10 2013 021981 A1 | 6/2015 | | |
| DE | 10 2014 208 722 A1 | 11/2015 | | |
| DE | 102017214198 A1 * | 2/2019 | | B60K 13/04 |
| DE | 102018210791 B3 * | 8/2019 | | F01N 13/082 |
| DE | 102018211494 B3 * | 11/2019 | | |
| DE | 102018209225 A1 * | 12/2019 | | |
| EP | 848144 A1 * | 6/1998 | | F01N 13/082 |
| EP | 2 031 204 A2 | 3/2009 | | |
| EP | 3 121 406 A1 | 1/2017 | | |

* cited by examiner

ASSEMBLY AND METHOD FOR BRAKING THE DISPLACEMENT OF A TAILPIPE COVER

CROSS-REFERENCE TO RELATED APPLICATIONS

This continuation application claims priority to PCT/EP2018/070815 filed on Aug. 1, 2018 which has published as WO 2019/034419 A1 and also the German application number 10 2017 214 197.2 filed on Aug. 15, 2017, the entire contents of which are fully incorporated herein with these references.

DESCRIPTION

Field of the Invention

The invention relates to an assembly for braking the displacement of a tailpipe trim. The invention furthermore relates to the provision of a method for braking the displacement of a tailpipe trim.

Background of the Invention

Tailpipe trims for embellishing or protecting tailpipes are known from the prior art. EP 3 121 406 A1 discloses a mounting system for a tailpipe trim which comprises at least three undulating spring claws which are fastened to the tailpipe.

Disadvantageously, damage may occur to the tailpipe trim, the tailpipe and the engine to which the tailpipe leads, if the tailpipe trim is displaced out of the mounting position thereof, against the tailpipe, for example by a colliding vehicle in the event of an accident.

The object of the invention is therefore that of providing an assembly in which damage to the exhaust system is prevented, in the event of an accident. A further object of the invention is that of specifying a quick and reliable method for preventing damage to the exhaust system in the case of collisions.

This object is achieved by an assembly according to the independent claim. The features of the method according to the invention are also specified herein. Advantageous embodiments can be found in the respective dependent claims.

SUMMARY OF THE INVENTION

The assembly according to the invention for braking the displacement of a tailpipe trim comprises a tailpipe trim, a clamping element, and a tailpipe. The clamping element is provided with a resilient material and arranged at least indirectly both on the tailpipe trim and on the tailpipe. A portion of the clamping element protrudes beyond the tailpipe in the axial direction, in parallel with the longitudinal axis of the tailpipe trim. In this portion which protrudes beyond the tailpipe the clamping element is formed so as to be radially smaller than the tailpipe, at least in part, with respect to the longitudinal axis of the tailpipe trim. Alternatively or in addition thereto, at least one portion of the clamping element is at least indirectly non-displaceably arranged on the tailpipe, in parallel with said longitudinal axis.

The clamping element can in particular comprise a spring element or a resilient element. A spring element of this kind can comprise windings or folds. Furthermore, the clamping element can comprise bendable and/or rotatable lever arms, in particular resilient lever arms, which can be rotated or bent about a fixed point. The clamping element can be stretched or compressed or, in regions, in particular at the lever arms, rotated and/or bent, by means of an acting force. As a result, the clamping element can resiliently exert a force or effect that is counter to the acting force.

The clamping element comprises a portion that protrudes beyond the tailpipe. One end of the clamping element is arranged so as to be offset relative to the free end of the tailpipe, in particular in the axial direction, in parallel with the longitudinal axis of the tailpipe trim.

In the radial direction, the spacing between the longitudinal axis of the tailpipe trim and said portion of the clamping element that protrudes beyond the tailpipe is smaller, at least in part, than the spacing between the longitudinal axis of the tailpipe trim and the outside wall of the tailpipe. This relates to at least the side of the portion protruding beyond the tailpipe, which side faces said longitudinal axis. As a result, said portion can be moved towards the tailpipe when the tailpipe trim is displaced or moved out of the mounting position thereof towards the tailpipe, or in the direction of the longitudinal axis of the tailpipe trim, or in the direction of an axis that is in parallel with said longitudinal axis. Said displacement can then be stopped, in a resilient manner, by the clamping element.

Alternatively or in addition thereto, a portion of the clamping element can be arranged on the tailpipe such that said portion cannot be displaced in the direction of the longitudinal axis of the tailpipe trim or in the axial direction, in parallel with said longitudinal axis. The clamping element made of resilient material can then likewise be compressed or stretched or bent in portions, by a force that acts on the clamping element in the axial direction, in parallel with the longitudinal axis thereof. As a result, the clamping element can in turn exert a force or effect that is counter to an acting force of this kind. As a result, the movement or displacement of the tailpipe trim can be braked or stopped. This arrangement of the clamping element or of the portion of the clamping element on the tailpipe can be provided directly or indirectly, for example if further layers are arranged between the clamping element and the tailpipe.

Advantageously, in this manner, damage can be prevented by making use of the spring effect of the resilient material in the clamping element, when the tailpipe trim is displaced out of the mounting position thereof, further beyond the tailpipe. In particular, the movement of the tailpipe trim can be braked and/or ended in a controlled manner, by means of the assembly according to the invention, and/or the tailpipe trim can be moved back into the mounting position thereof by means of the spring effect of the clamping element.

In an advantageous embodiment of the assembly, the free end of the tailpipe rests on the clamping element. The free end of the tailpipe touches the clamping element, and the free end of said tailpipe is in mechanical contact with the clamping element. As a result, the resilient braking effect of the clamping element can be brought about immediately when the movement of the tailpipe trim occurs.

In an advantageous embodiment of the assembly, an end portion of the clamping element is hook-shaped. The end portion thus in particular has a bend or curvature, as a result of which it assumes the shape of a hook. In the case of a hook-shaped design of the end portion of the clamping element, a bending process or sliding process can change the surface on which the maximum force acts during the braking process. This protects the clamping element. A hook-shaped embodiment of the end portion also makes it possible for the braking effect to be gradually increased as the bending of the clamping element increases, allowing for gentle braking.

In an advantageous embodiment of the assembly, an end portion of the tailpipe trim is hook-shaped. The end portion thus in particular has a bend or curvature, as a result of which it assumes the shape of a hook. It can in particular have a bend of 180°. The end of the tailpipe trim can then point in the direction of the clamping element, in order to bring about the braking and ending of the above-mentioned movement of the tailpipe trim.

In a further embodiment of the assembly, the end portion of the clamping element and the end portion of the tailpipe trim are in contact with one another. In this case, the end portion of the clamping element can touch the end portion of the tailpipe trim only in a narrow strip, or can be in mechanical contact therewith over a large surface. In particular, the end of the tailpipe trim can be arranged on the end portion of the clamping element such that a displacement of the tailpipe trim out of the mounting position thereof brings about bending or rotation of the tailpipe trim of the clamping element, resulting in braking of said displacement. This applies in particular for the case in which the end portion of the clamping element and the portion of the tailpipe trim are both hook-shaped.

In an advantageous embodiment of the assembly, the clamping element has a profile that is arcuate at least in portions. As a result, a spring-like braking effect of the clamping element can be increased.

In an advantageous embodiment of the assembly, the tailpipe trim comprises a buffer at one end. In the mounted state of the tailpipe trim, the buffer can strike the tailpipe when the tailpipe trim is moved in the axial direction, in parallel with the longitudinal axis of the tailpipe trim. In particular, one end portion of the clamping element is arranged on the buffer. The buffer can likewise comprise resilient material. Said buffer can be designed in the form of an elongate rod or bolt, in particular having a bend or curvature. One end of the buffer can be oriented in the direction of the tailpipe. A buffer can damp the braking of the displacement or movement of the tailpipe trim.

In an advantageous embodiment of the assembly, the clamping element is arranged on a mounting pipe. In this case, the mounting pipe is arranged on the outside wall of the tailpipe. A mounting pipe of this kind makes it possible for the tailpipe trim and the clamping element arranged on the tailpipe trim to be mounted on the tailpipe in a simple manner, by means of the mounting pipe being pushed over the tailpipe or the free end thereof. In this case, in particular a hook-shaped end portion can be formed on the mounting pipe, which end portion is arranged on an end of the tailpipe. In particular, a hook-shaped end portion forms additional protection for the tailpipe. For this purpose, the hook-shaped end portion can cover the tailpipe at least in part.

In an advantageous embodiment of the assembly, the clamping element is at least indirectly fastened on the tailpipe or connected to the tailpipe. In particular, the clamping element is fastened on the tailpipe or connected to the tailpipe so as to be detachable in a non-destructive manner. If the clamping element is fastened to the tailpipe, said clamping element is arranged or fixed in a non-movable manner not only in the axial direction, in parallel with the longitudinal axis of the tailpipe trim, but rather in all directions. As a result, the clamping element can be arranged in a stable manner on the tailpipe, meaning that the braking of the displacement of the tailpipe trim can also be brought about in a reliable manner. For the purpose of fastening, the clamping element can for example be welded to the tailpipe.

The clamping element can be fastened to the tailpipe so as to be detachable in a non-destructive manner, in that it is for example screwed on or clamped on. It is then possible, inter alia when exchanging the clamping element, for said clamping element to be removed from the tailpipe without the tailpipe being damaged.

In an advantageous embodiment of the assembly, the clamping element is fastened on the tailpipe trim or connected to the tailpipe trim. In particular, the clamping element is fastened on the tailpipe trim so as to be detachable in a non-destructive manner. As a result, the clamping element can be arranged on the tailpipe trim so as to be stable and non-displaceable in all directions. If the clamping element is also fastened to the tailpipe, the tailpipe trim is stably fastened to the tailpipe via the clamping element, without further components.

In a method for non-destructive braking of the displacement of a tailpipe trim in the direction of the longitudinal axis of a tailpipe, a clamping element comprising a resilient material is arranged on a tailpipe trim and on a tailpipe. A portion of the clamping element protrudes beyond the tailpipe in the direction of the longitudinal axis of the tailpipe trim. In said portion which protrudes beyond the tailpipe, the clamping element is formed so as to be radially smaller than the tailpipe, at least in part, with respect to the longitudinal axis of the tailpipe trim. Alternatively or in addition thereto, at least one portion of the clamping element is at least indirectly non-displaceably arranged on the tailpipe in the direction of said longitudinal axis. In the case of a collision, the clamping element is resiliently deformed in the axial direction, in parallel with the longitudinal axis of the tailpipe trim, by means of a displacement or movement of the tailpipe trim. In this case, said movement of the tailpipe trim is braked. In particular, despite high forces that arise in the event of an accident, the movement of the tailpipe trim in the direction of the tailpipe can be braked and/or ended, in a damped manner, by the resilient clamping element.

BRIEF DESCRIPTION OF THE DRAWINGS

Further features and advantages of the invention can be found in the following detailed description of a plurality of embodiments of the invention, in the claims, and with reference to the figures of the drawings which show details that are essential to the invention. The various features can be achieved individually, in each case, or together in any desired combinations, in variants of the invention. The features shown in the drawings are set out such that the particularities according to the invention can be made clearly visible.

In the drawings.

DETAILED DESCRIPTIONS OF THE PREFERRED EMBODIMENTS

Figure 1:
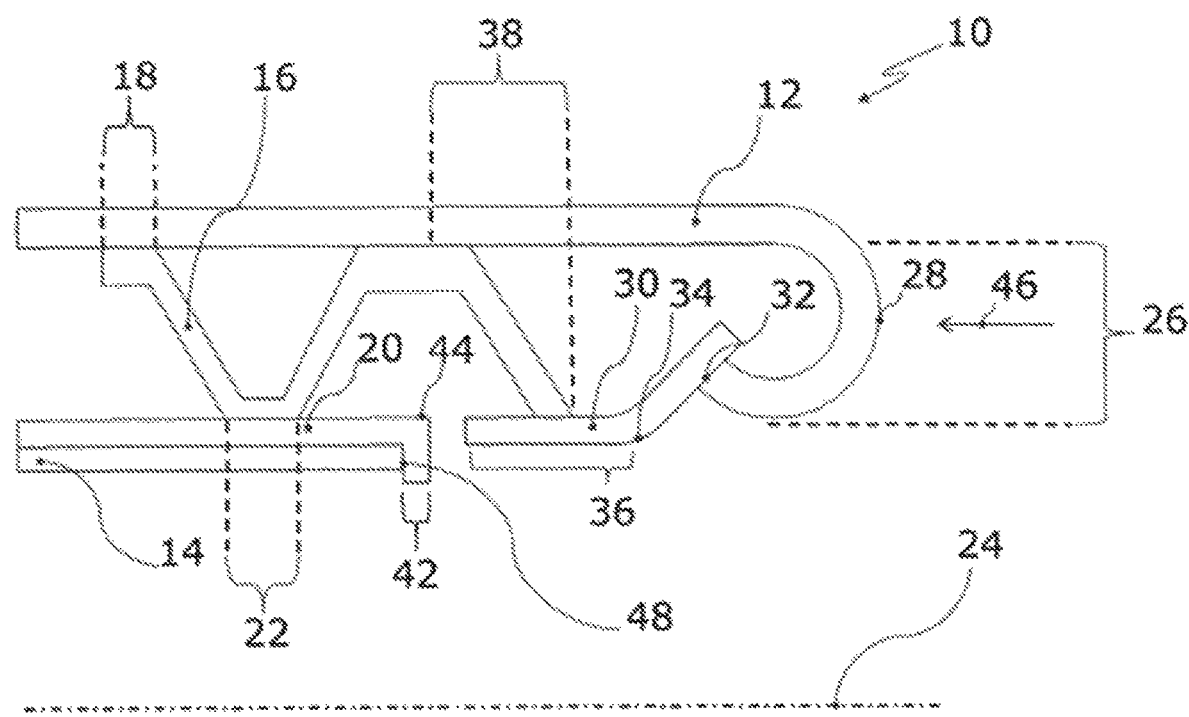
FIG. 1 is a schematic partial longitudinal sectional view of a first embodiment of an assembly for braking the displacement of a tailpipe trim.

FIG. 1 shows a first embodiment of the assembly 10 according to the invention for braking the displacement of a tailpipe trim 12, comprising a tailpipe 14. The tailpipe trim 12 can protect the tailpipe 14 from damage. In addition to the tailpipe trim 12, the assembly 10 also comprises a clamping element 16 which can bring about the braking. The clamping element 16 is arranged between the tailpipe trim 12 and the tailpipe 14.

The clamping element 16 in particular comprises resilient material. The clamping element 16 can be made of spring steel, for example. In this case, a first portion 18 of the clamping element 16 is arranged on the tailpipe trim 12. A second portion 22 of the clamping element 16 is positioned on a mounting pipe 20 of the assembly 10. The mounting pipe 20 is arranged on the outside, on the tailpipe 14. The mounting pipe 20 can be displaced beyond the tailpipe 14 in portions, in order to mount the tailpipe trim 12 and the clamping element 16 on the tailpipe 14.

The second portion 22 of the clamping element 16 is arranged on the mounting pipe 20, and thus indirectly on the tailpipe 14, so as to be non-displaceable in the axial direction, in parallel with the longitudinal axis 24 of the tailpipe trim 12. As a result, the clamping element 16 can bring about braking of the movement of the tailpipe trim 12, when the tailpipe trim 12 is moved relative to the tailpipe 14. The second portion 22 of the clamping element 16 is furthermore offset axially with respect to the first portion 18 of the clamping element 16, in the direction along the longitudinal axis 24 of the tailpipe trim 12.

The tailpipe trim 12 comprises an end portion 26 having a hook-shaped profile 28. The end portion 26 of the tailpipe trim 12 protrudes beyond the tailpipe 14, in the direction of the longitudinal axis 24 of the tailpipe trim 12. The hook-shaped profile 28 is used for orienting and positioning a buffer 30 which is arranged on an end 32 of the hook-shaped end portion 26 of the tailpipe trim 12, for the purpose of damping during braking of the movement of the tailpipe trim 12. The buffer 30 has a bend 34. As a result, an end portion 36 of the buffer 30 can be guided in parallel with the tailpipe 14, which end portion is oriented towards the tailpipe 14.

A third portion 38 of the clamping element 16, which protrudes axially beyond the tailpipe 14, is arranged such that one end thereof is on the tailpipe trim 12 and the other end is on the end portion 36 of the buffer 30. When the tailpipe trim 12 and the buffer 30 are moved in the direction of the tailpipe 14, said third portion 38 brings about braking and/or ending of said movement, by means of bending.

In order to protect the tailpipe 14 and to provide a stop when mounting the mounting pipe 20 on the tailpipe 14, an end portion 42 of the mounting pipe 20 having a hook-shaped profile 44 is formed on the mounting pipe 20. Said end portion 42 covers the tailpipe 14, in the peripheral direction, in part. If the tailpipe trim 12 is moved relative to and in parallel with the tailpipe 14 in a direction 46 such that the end portion 26 of the tailpipe trim 12 is moved in the direction of the tailpipe 14, this movement is stopped in a damped manner when the buffer 30 strikes the mounting pipe 20, at the free end 48 of the tailpipe 14. The movement or displacement direction 46 is designed so as to be in parallel with the direction of the longitudinal axis 24 of the tailpipe trim 12.

Figure 2:
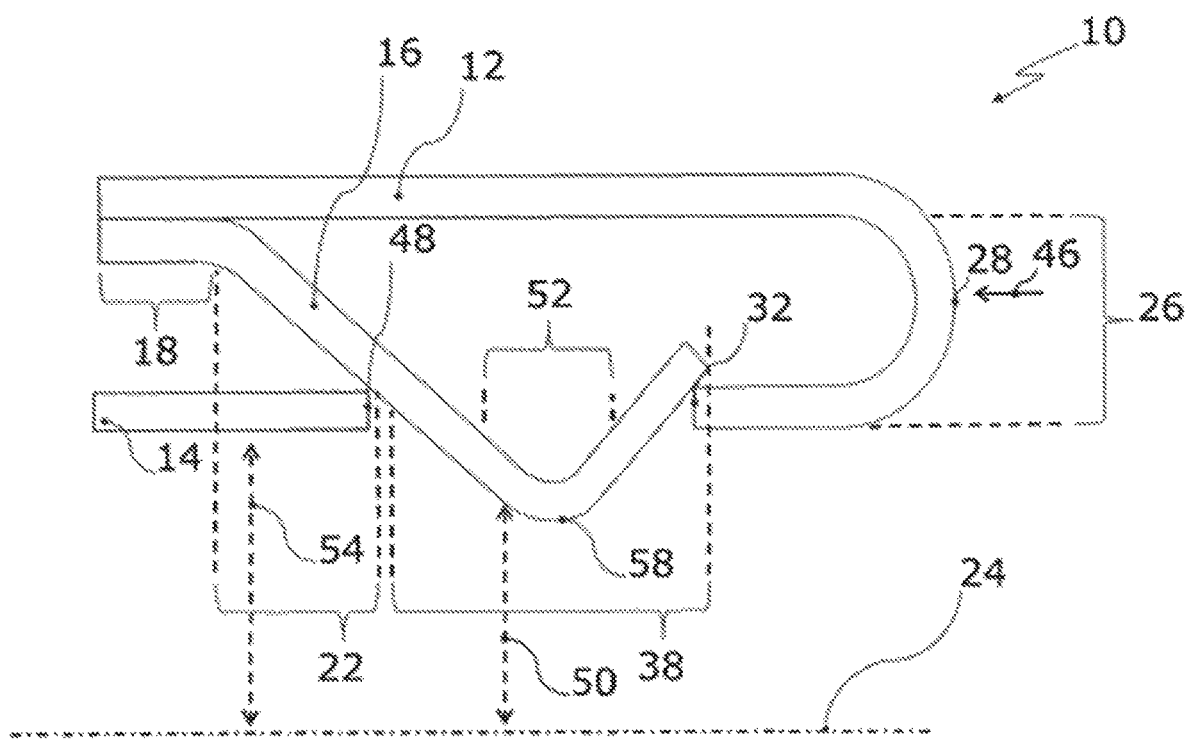
FIG. 2 is a schematic partial longitudinal sectional view of a second embodiment of an assembly for braking the displacement of a tailpipe trim.

FIG. 2 shows a second embodiment of the assembly 10 according to the invention for braking the displacement of a tailpipe trim 12. A first portion 18 of a clamping element 16 is arranged on the tailpipe trim 12. A second portion 22 of the clamping element 16 is arranged on the free end 48 of a tailpipe 14. In other words, in order to brake a displacement of the tailpipe trim 12, the free end 48 of a tailpipe 14 rests on the second portion 22 of the clamping element 16. A third portion 38 of the clamping element 16 protrudes axially beyond the tailpipe 14. In this case, the spacing 50 between the longitudinal axis 24 of the tailpipe trim 12 and the third portion 38 of the clamping element 16 assumes smaller values, in the segment 52 of the third portion 38, than the spacing 54 between the longitudinal axis 24 of the tailpipe trim 12 and the tailpipe 14. As a result, the clamping element 16 can bring about the braking effect with respect to a movement of the tailpipe trim 12 in the direction 46 in parallel with the longitudinal axis 24 of the tailpipe trim 12.

The third portion 38 is arranged on the end 32 of the end portion 26 of the tailpipe trim 12. In other words, the third portion 38 of the clamping element 16 and the end portion 26 of the tailpipe trim 12 rest on one another. Said end portion 26 of the tailpipe trim 12 has a hook-shaped profile 28 having a curvature of about 180°±30°, in particular about 180°±15°. As a result, the end 32 of the end portion 26 of the tailpipe trim 12 is oriented so as to be in parallel with the tailpipe 14 and towards the tailpipe 14. The third portion 38 of the clamping element 16 has a hook-shaped profile 58. If the tailpipe trim 12 is moved in the direction 46 in parallel with the tailpipe 14 or with the longitudinal axis 24 of the tailpipe trim 12, said movement is braked and/or stopped by the third portion 38 of the clamping element 16, by means of the arrangement thereof between the free end 48 of the tailpipe 14 and the end 32 of the end portion 26 of the tailpipe trim 12.

Figure 3:
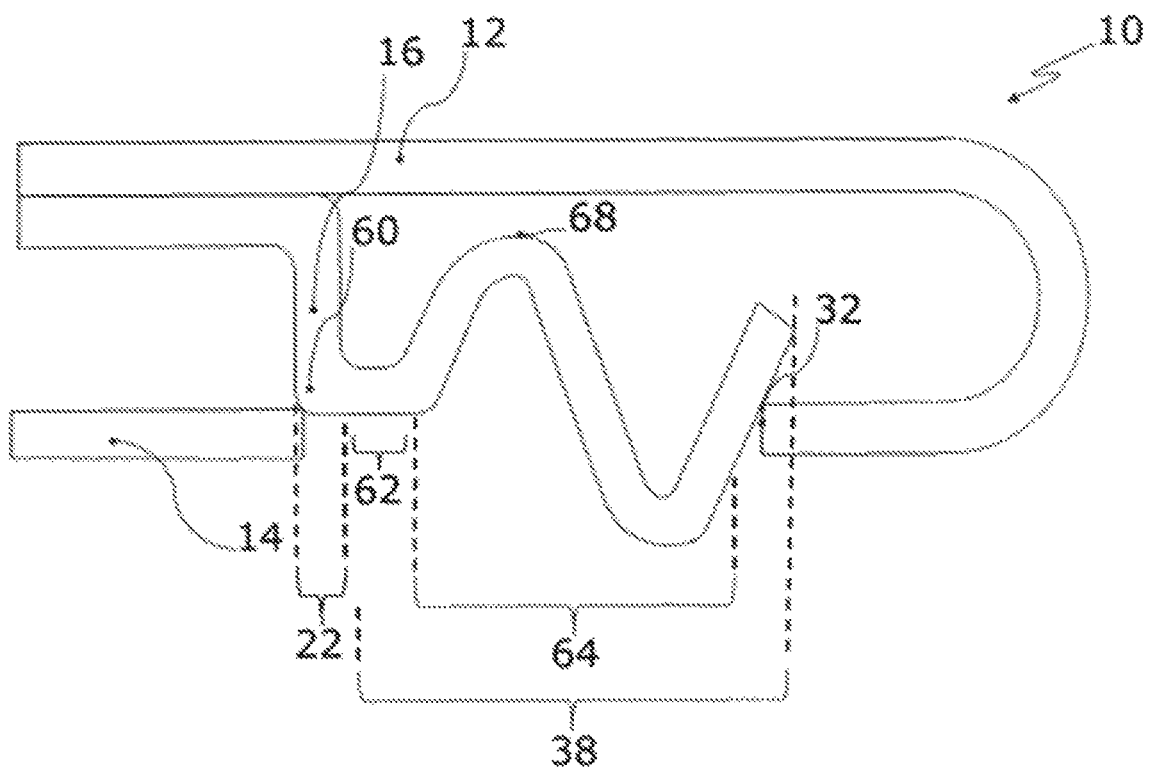
FIG. 3 is a schematic partial longitudinal sectional view of a third embodiment of an assembly for braking the displacement of a tailpipe trim.

FIG. 3 shows a third embodiment of an assembly 10 according to the invention for braking the movement of a tailpipe trim 12. In contrast with the second embodiment of the assembly 10, a bend 60 about a right angle or approximately a right angle is formed on the second portion 22 of the clamping element 16, which is arranged directly on the tailpipe 14. As a result, the clamping element 16 extends in a fourth portion 62 which is arranged on the second portion 22 of the clamping element 16, between the tailpipe 14 and the end 32 of the tailpipe trim 12, in the region of the bend 60 and so as to be in parallel with or approximately in parallel with the tailpipe trim 14.

In a fifth portion 64 which is arranged so as to adjoin the fourth portion 62 of the clamping element 16 in the direction of the end 32 of the tailpipe trim 12, the clamping element 16 has an arcuate profile 68. As a result, the braking effect of the clamping element 16 can be increased. The fourth portion 62 and the fifth portion 64 form segments of a third portion 38 of the clamping element 16 which protrudes axially beyond the tailpipe 14.

Figure 4:
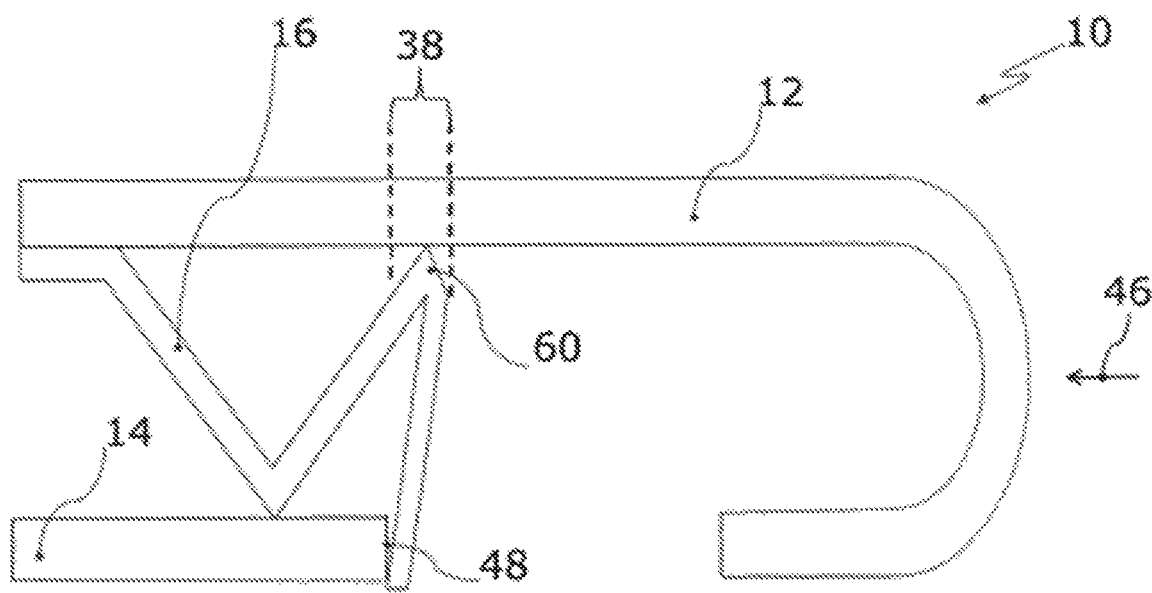
FIG. 4 is a schematic partial longitudinal sectional view of a fourth embodiment of an assembly for braking the displacement of a tailpipe trim.

FIG. 4 shows a fourth embodiment of an assembly 10 according to the invention for braking the movement of a tailpipe trim 12. In contrast to the preceding embodiments of the assembly 10, a third portion 38 of the clamping element 16, which protrudes axially beyond the tailpipe 14, is arranged on the free end 48 of the tailpipe 14. The third portion 38 of the clamping element 16 has a bend 60 which can be arranged on the tailpipe trim 12. The clamping element 16 is stretched when the tailpipe trim 12 is moved in the direction 46 in parallel with the tailpipe 14. The third portion 38 of the clamping element 16 is then bent and pressed against the end 48 of the tailpipe 14. As a result, said movement of the tailpipe trim 12 is braked.

Figure 5:
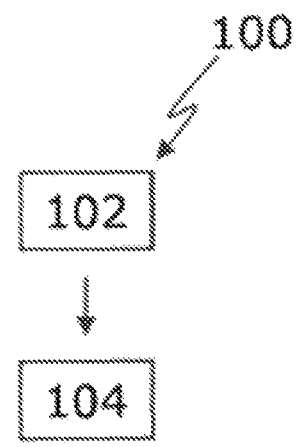
FIG. 5 is a schematic view of a method for braking the displacement of a tailpipe trim.

FIG. 5 schematically shows a method 100 for braking the movement of a tailpipe 14, which is explained in the following in connection with the assembly 10 according to FIG. 1. In this case, a clamping element 16 comprising resilient material is arranged on a tailpipe trim 12 and on a tailpipe 14. A portion 38 of the clamping element 16 protrudes beyond the tailpipe 14, in the axial direction, in parallel with the longitudinal axis 24 of the tailpipe trim 12. In said portion 38 which protrudes beyond the tailpipe 14, the clamping element 16 is formed so as to be radially smaller than the tailpipe 14, at least in part, with respect to the longitudinal axis 24 of the tailpipe trim 12. Alternatively or in addition thereto, at least one portion 22 of the clamping element 16 is at least indirectly non-displaceably arranged on the tailpipe 14, in the direction of said longitudinal axis 24. In the case of a collision, in a step 102 the clamping element 16 is resiliently deformed in the axial direction 46, in parallel with the longitudinal axis 24 of the tailpipe trim 12, by means of a displacement or movement of the tailpipe trim 12. In this case, said movement of the tailpipe trim 12 is braked in a step 104.

Considering all the figures of the drawings in overview, the invention relates, in summary, to an assembly 10 for braking the displacement of a tailpipe trim 12. The assembly 10 comprises a clamping element 16 comprising resilient material, a tailpipe 14, and a tailpipe trim 12. The clamping element 16 is arranged at least indirectly on the tailpipe 14 and on the tailpipe trim 12. In this case, a portion 38 of the clamping element 16 protrudes beyond the tailpipe 14, in the axial direction, in parallel with the longitudinal axis 24 of the tailpipe trim 12. In said portion 38 of the clamping element 16, the spacing 50 between said longitudinal axis 24 and the clamping element 16 is designed so as to be smaller, at least in part, than the spacing 54 between said longitudinal axis 24 and the tailpipe 14. Alternatively or in addition thereto, at least one portion 22 of the clamping element 16 is at least indirectly non-movably arranged on the tailpipe 14, in the direction of the longitudinal axis 24.

What is claimed is:

1. An assembly for braking the displacement of a tailpipe trim, comprising:
   a tailpipe trim;
   a clamping element; and
   a tailpipe;
   wherein the clamping element comprises a resilient material and is arranged at least indirectly both on the tailpipe trim and on the tailpipe;
   wherein a portion of the clamping element protrudes beyond the tailpipe, in the axial direction, in parallel with the longitudinal axis of the tailpipe trim, and, in the portion that protrudes beyond the tailpipe, the clamping element is formed so as to be radially smaller than the tailpipe, at least in part, wherein the portion of the clamping element that protrudes beyond the tailpipe is hook-shaped, and an end portion of the tailpipe trim is hook-shaped, and the portion of the clamping element that protrudes beyond the tailpipe, and the end portion of the tailpipe trim rest on one another.

2. The assembly according to claim 1, wherein the free end of the tailpipe rests on the clamping element.

3. The assembly according to claim 1, wherein the clamping element has an arcuate profile in at least one portion.

4. The assembly according to claim 1, wherein the tailpipe trim comprises a buffer at one end, which buffer can strike the tailpipe when the tailpipe trim is moved in the axial direction, in parallel with the longitudinal axis of the tailpipe, wherein the clamping element is arranged on the buffer.

5. The assembly according to claim 1, wherein the clamping element is arranged on a mounting pipe of the assembly that is arranged on the outside of the tailpipe, wherein the mounting pipe comprises a hook-shaped end portion that is arranged on the free end of the tailpipe.

6. The assembly according to claim 1, wherein the clamping element is fastened at least indirectly to the tailpipe, and is fastened so as to be detachable in a non-destructive manner.

7. The assembly according to claim 1, wherein the clamping element is fastened to the tailpipe trim, and is fastened so as to be detachable in a non-destructive manner.

8. A method for non-destructive braking of the displacement of a tailpipe trim in the axial direction, in parallel with the longitudinal axis of a tailpipe, the method comprising the steps of:
   providing a clamping element, wherein a clamping element comprising a resilient material is arranged on a tailpipe trim and on a tailpipe, wherein a portion of the clamping element protrudes beyond the tailpipe, in the axial direction, in parallel with the longitudinal axis of the tailpipe trim, and, in the portion that protrudes beyond the tailpipe, the clamping element is formed so as to be radially smaller than the tailpipe, at least in part, with respect to the longitudinal axis of the tailpipe trim, wherein the portion of the clamping element which protrudes beyond the tailpipe is hook-shaped, and an end portion of the tailpipe trim is hook-shaped, and the portion of the clamping element that protrudes beyond the tailpipe, and the end portion of the tailpipe trim, rest on one another; and
   wherein in the case of a collision, resiliently deforming the clamping element in the direction of the longitudinal axis of the tailpipe trim, by means of a movement of the tailpipe trim, and in the process braking the movement of the tailpipe trim.

* * * * *

UNITED STATES PATENT AND TRADEMARK OFFICE
CERTIFICATE OF CORRECTION

| | | |
|---|---|---|
| PATENT NO. | : 11,459,931 B2 | Page 1 of 1 |
| APPLICATION NO. | : 16/789068 | |
| DATED | : October 4, 2022 | |
| INVENTOR(S) | : Sebastian Reissig, Raul Jurj and Sebastian Radtke | |

It is certified that error appears in the above-identified patent and that said Letters Patent is hereby corrected as shown below:

On the Title Page

Column 1, below the Related U.S. Application Data:
Insert --Foreign Application Priority Data
Aug. 15, 2017 (DE) ..................... 10 2017 214 197.2--.

Signed and Sealed this
Twentieth Day of December, 2022

Katherine Kelly Vidal
*Director of the United States Patent and Trademark Office*